E. RHOADES,

Assignor of one-half interest to H. H. PALMER.

Churn.

No. 9,225. Reissued June 1, 1880.

Witnesses.
A. O. Behel.
L. A. Phoenix.

Inventor.
Edward Rhoades
Per. Jacob Behel.
Atty.

N. PETERS, PHOTO-LITHOGRAPHER, WASHINGTON, D. C.

UNITED STATES PATENT OFFICE.

EDWARD RHOADES, OF ROCKFORD, ILLINOIS, ASSIGNOR OF ONE-HALF INTEREST TO HENRY H. PALMER, OF SAME PLACE.

CHURN.

SPECIFICATION forming part of Reissued Letters Patent No. 9,225, dated June 1, 1880.

Original No. 194,785, dated September 4, 1877. Application for reissue filed February 13, 1880.

*To all whom it may concern:*

Be it known that I, EDWARD RHOADES, of Rockford, in the county of Winnebago and State of Illinois, have invented a new and useful Improvement in Churns; and I do hereby declare that the following is a full and exact description of the same, reference being had to the accompanying drawings, and to the letters of reference marked thereon.

Figure 1:
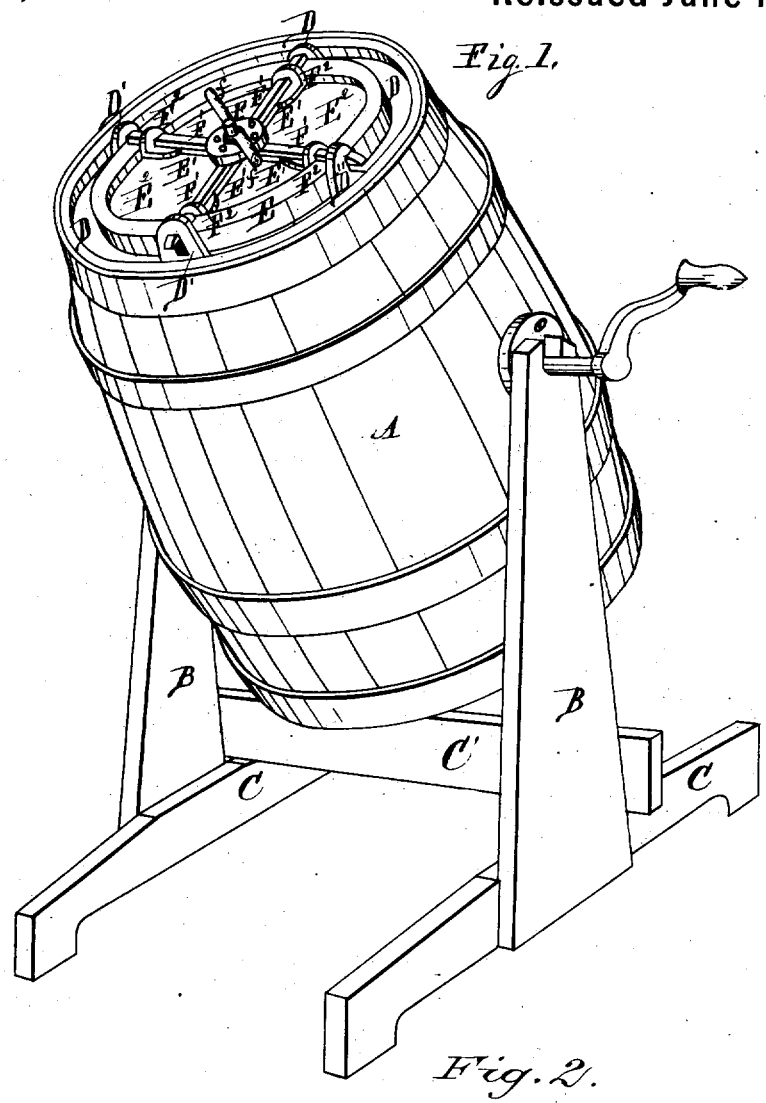
Figure 2:
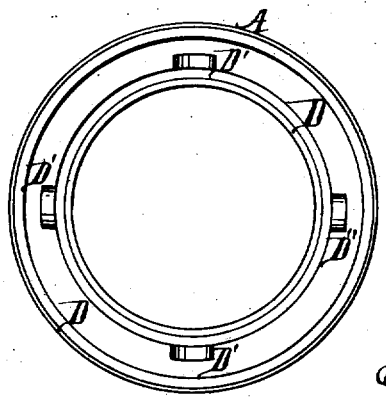

Figure 1 is a perspective view of the churn mounted upon trunnions within the supporting-frame; and Fig. 2 is a top view of the head, showing the manner of securing the same to prevent leaking while in operation.

Similar letters of reference denote corresponding parts in both figures.

The object of this invention is to provide a simple and sure fastening of the removable head to that class of churns which revolve endwise; and it consists of the ordinary barrel-churn mounted in a frame of sufficient capacity to allow of an end-over-end revolution, and having an open head made by the use of a metallic ring, carrying catch-ears attached to the ring, into which are simultaneously projected securing bolts or bars located upon the removable cover, and by means of which the cover is made fast to the churn-body, all of which will be hereinafter described.

In the drawings, A represents the churn-body; B, the uprights upon which the body is mounted; C, the foot-piece of the frame, and C′ the connecting cross-bar.

D is a metallic ring, which can be tinned over or in any other manner made rust-proof, and it is fitted with catch-ears, which, in this instance, rise in a vertical position from the plane of the ring. These ears as represented at D′ are perforated, and as at D″ are made in hook form, and are adapted to receive a lid-fastening to fix in place thereon a removable lid. This ring is made to enter the groove cut in the end of the body, as is ordinarily done for securing the head, and which, by having the hoops tightly driven upon the shell, keeps the whole barrel in shape.

E is a metallic ring, supported by crucial arms E′, and to which is secured a wooden cover, $E^2$. These metal parts E and E′ are used to prevent the warping or twisting of the cover $E^2$.

F is a central hub, secured to the cover by a pivotal connection, and is provided with arms *f*, by means of which the hub may be given a partial revolution, for a purpose hereinafter described.

F′ are bolts, pointed or made wedge-shaped at their outer ends, and having their inner ends pivoted to the periphery of the hub F in such manner that as the said hub is turned to the right or left upon its central pivot a crank movement is given the bolts by the pivotal connection of the same with the hub, for the purpose of causing an end movement of the said bolts when it is desired to lock or unlock the cover to or from the body.

$F^2$ are staples or guides, secured either to the crucial arms or to the rim of the cover, through which the bolts F′ slide and secure the same from lateral displacement.

The ordinary packing may be used between the inner face of the cover and the metal ring forming the open head of the body.

If the churn is not evenly balanced by reason of the weight of the large quantity of metal used in forming its cover end, a metal counter-balance may be secured to the reverse or bottom end of the barrel. The ordinary crank may be used for revolving the churn.

It will be observed that in order that the pointed or wedge-shaped bolts shall press equally the relative position of the bolts and the securing ears or catches must always be maintained, which could not be done were the ears secured to the wood portions of the body instead of the metal ring, as the moisture incident upon the use of the churn causes the wood to shrink and swell with the consequent variations in the positions of the fastenings.

Having now described my invention, what I claim as new, and desire to secure by Letters Patent, is—

1. A metallic ring-head having stationary catch-ears projecting outwardly therefrom, said catch-ears made of a single piece of metal, and adapted to receive a lid-fastening attached to a removable lid, substantially as set forth.

2. In a barrel-shaped churn-body having the open ring-head, the combination of the catch-ears located upon the open ring, the simultaneously-operating bolts engaging the ears, and the wooden cover incased in metal and resting upon the ring, all arranged and operating substantially as described.

3. The combination of the churn-body having the open head or end, the cover having the surrounding rim and crucial arms carrying a central hub, the wedge-shaped bolts eccentrically pivoted to the hub, the staples $F^2$, and the metallic ring having the vertical catch-ears, all these parts arranged and operating substantially as described, and for the purpose herein set forth.

EDWARD RHOADES.

Witnesses:
JACOB BEHEL,
JOHN C. GARVER.